UNITED STATES PATENT OFFICE.

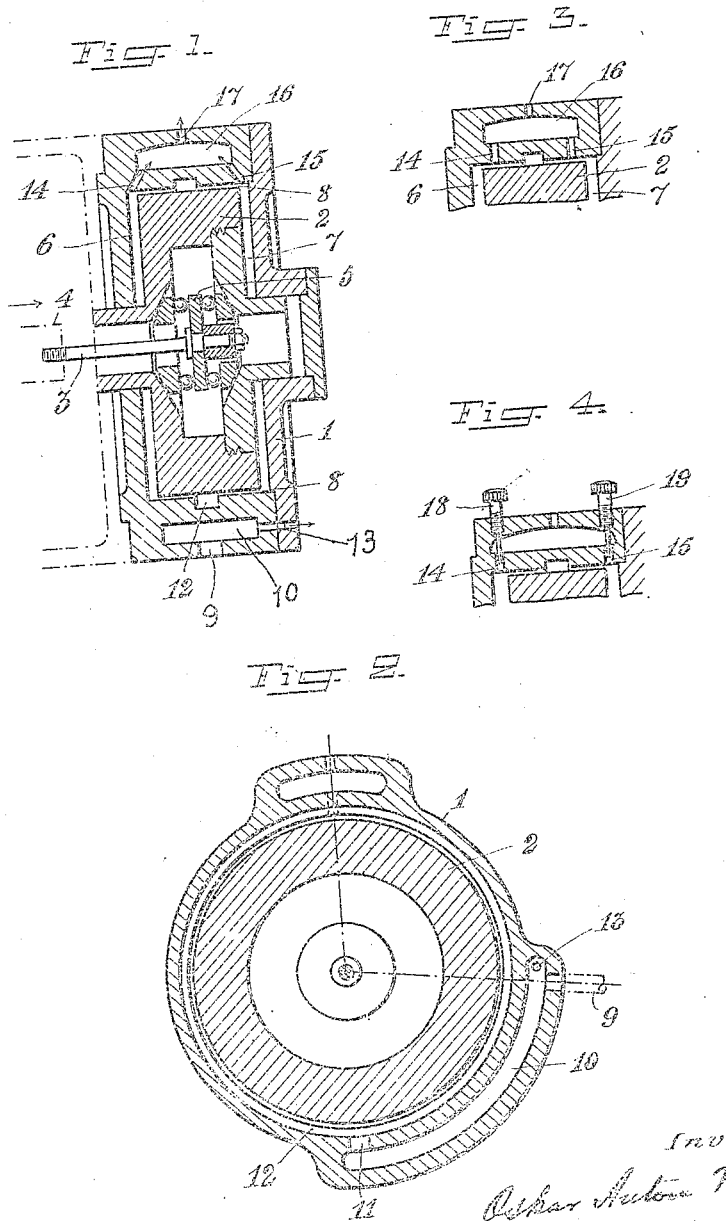

OSKAR ANTON WIBERG, OF FINSPONG, SWEDEN, ASSIGNOR, BY MESNE ASSIGNMENTS, TO AKTIEBOLAGET LJUNGSTROMS ANGTURBIN, OF STOCKHOLM, SWEDEN, A CORPORATION.

MEANS FOR PREVENTING AXIAL VIBRATIONS OF TURBINE AND OTHER SHAFTS.

1,285,521.   Specification of Letters Patent.   Patented Nov. 19, 1918.

Application filed May 24, 1918. Serial No. 236,323.

*To all whom it may concern:*

Be it known that I, OSKAR ANTON WIBERG, subject of the King of Sweden, residing in Finspong, Sweden, have invented certain new and useful Improvements in Means for Preventing Axial Vibrations of Turbine and other Shafts, of which the following is a description.

It has already been proposed, for the purpose of preventing axial vibrations of turbine and similar rapidly rotating shafts to employ special arrangements in the form of a liquid-brake or damper. The construction of such arrangements as have heretofore been made has been somewhat complicated so that it has been a matter of great difficulty to obtain a reliable action.

The present invention is intended to bring about an arrangement of the kind mentioned which will be at once simple and reliable in its action. The principal feature of the invention resides in the fact that the damping or braking arrangement is constructed in the form of a liquid-brake without valves.

In the accompanying drawing, Figure 1 shows an axial section of my improved construction taken on the section line indicated on Fig. 2; Fig. 2 a transverse section of the same, and Figs. 3 and 4 are detail views showing modifications of the connecting ports or passages of the brake-chambers.

In the embodiment shown in Figs. 1 and 2, 1 is a brake-cylinder which, in any suitable way is firmly attached to a frame or support beyond the end of the turbine shaft and in such a position, that it lies coaxially with the turbine-shaft. 2 is a piston arranged in the said cylinder with an inconsiderable peripheral clearance. The piston 2 is connected by a rod 3 with the end of the turbine or other shaft 4, the axial vibrations of which are to be damped. The rod 3 is connected by a slip-joint, in this case a thrust bearing, preferably a double acting ball bearing 5, with the piston 2, so that the latter need not take part in the rotation of the turbine or other shaft. The length of the piston 2 is so proportioned with respect to that of the brake cylinder 1 that brake or fluid containing chambers 6 and 7 are formed on each side thereof. These chambers communicate with each other by means of the inconsiderable clearance 8 between the piston 2 and the surrounding wall of the cylinder 1 so that liquid can flow comparatively slowly from the one brake chamber to the other. The piston is provided with cylindrical hollow guides on opposite sides, each of which makes a sliding fit with a cylinder head, the purpose of the arrangement being to hold the piston central with respect to the axis of the cylinder and preserve a uniform clearance around it.

In order to obtain a fully non-elastic damping it is important that no air or other gas shall collect in the brake cylinder. For this purpose the inlet for the damping liquid (preferably oil) is arranged in a special way which makes it difficult for air or other gas to find its way into the brake cylinder. In addition to this the cylinder is provided with an arrangement for automatically permitting the air or gas which may find its way into the brake cylinder to escape. The inlet pipe 9 for the liquid receives its supply from a suitable source under pressure and is connected with a chamber 10 arranged outside the brake cylinder proper and through which the damping liquid must flow downward in order to enter the port 11 leading into the interior of the cylinder, the port 11 being arranged in the lowest part of the cylinder. The port 11 opens into an annular slot 12 in the wall of the brake cylinder; which slot is covered by the piston 2 so that the connection between the inlet and the brake chambers is through the clearance 8 whereby the damping liquid is prevented from being pressed back to any considerable degree through the inlet in consequence of the movements of the piston due to vibrations of the turbine or other shaft. Above the inlet 9 in the chamber 10 is a small outlet 13 preferably governed by an adjustable needle valve for the escape of air or gas that enters with the oil; the effect of this arrangement is that, practically speaking, the oil enters the brake cylinder free from air. In the upper part of the brake cylinder are two narrow ports or passages 14 and 15 which connect the brake chambers 6 and 7 with a connecting chamber or reservoir 16, the latter being provided with a small air outlet 17 at the top. When the piston oscillates a part of the damping liquid is driven over from one brake chamber to the other through the ports 14, 15 and chamber 16. Any air which may have entered the brake cylinder is carried along with the said damping liquid into the chamber 16 and is there permitted to separate from the same and escape through the small outlet 17.

According to Fig. 1 the ports 14, 15 are in direct communication with the brake chambers 6 and 7. But the ports can also be so arranged, as shown in Fig. 3, that their inner ends are covered by the piston 2 whereby they are in connection with the brake chambers 6 and 7 only through the restricted clearance 8. By this means there is obtained a throttling of the connection between the brake chambers so that on the vibrations of the turbine or other shaft only a small part of the damping liquid can flow that way. A similar effect can also be obtained by arranging in the connecting ports needle valves 18, 19, as shown in Fig. 4, by means of which valves the effective cross sectional areas of the ports can be governed according to circumstances.

From the description it will be seen that the main passage for the damping fluid from one brake chamber to the other is through the restricted clearance 8 between the piston and the surrounding cylinder wall, and that in shunt to this main path is another and relatively restricted passage comprising the passages 14 and 15 and the chamber 16. Further that the effective area of this shunt passage may be varied by adjusting one or both of the needle valves 18 and 19 and in this manner accurate adjustment of the apparatus obtained.

The apparatus depends for its action on the fact that area of the piston is relatively large while that of the clearance 8 and shunt passages is comparatively small. This means that when an axial thrust is exerted on the piston through the rod 3 the piston cannot respond freely for in order to change its position the liquid in one brake chamber must flow through the restricted clearance to the other, and due to this restriction an appreciable time interval is required with the result of damping or restricting the vibrations of the turbine shaft. The fact that the outlets for air and gas are small means that only a small amount of liquid can be forced out of them when the piston moves and this is immediately made up by the supply from pipe 9.

It will be seen that the construction does away with all valves in the main fluid path and that needle valves used only to make minor adjustments are provided. In this manner all danger due to sluggish operation or complete failure is avoided. This results in an extremely simple piece of apparatus which is not liable to get out of order because there are no nicely fitted parts to be maintained.

In accordance with the provisions of the latent statutes, I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is,

1. In an apparatus of the character described, the combination of a cylinder containing a damping fluid, a piston therein which divides the cylinder space into chambers which are connected by a restricted clearance located between the piston and the surrounding cylinder wall and through which fluid is free to flow at all times from one chamber to the other as the piston moves axially, means connecting the piston and the shaft whose axial movements are to be damped, and a fluid supply chamber arranged outside of the cylinder proper which communicates at its lower end with the cylinder space and has a free opening at its upper end to permit the escape of gas.

2. In an apparatus of the character described, the combination of a cylinder containing a damping fluid, a piston therein which divides the cylinder space into chambers which are connected by a restricted clearance located between the piston and the surrounding cylinder wall and through which fluid is free to flow at all times from one chamber to the other as the piston moves axially, means connecting the piston and the shaft whose axial movements are to be damped, a port in the cylinder which opens into said restricted clearance at a point between the ends of the piston and means for supplying fluid to said port.

3. In an apparatus of the character described, the combination of a cylinder containing a damping fluid, a piston therein which divides the cylinder space into chambers which are connected by a restricted clearance located between the piston and the surrounding cylinder wall and through which fluid is free to flow at all times from one chamber to the other as the piston moves axially, means connecting the piston and the shaft whose axial movements are to be damped, a chamber arranged outside the cylinder proper which is provided with an outlet to the atmosphere, and passages leading from the chambers on opposite sides of the piston to said chamber and through which fluid flows.

4. In an apparatus of the character described, the combination of a cylinder member closed at both ends and containing a damping fluid, a piston member therein dividing the cylinder space into two chambers which are connected by a restricted clearance located between the piston and the surrounding cylinder wall and which forms a main passage through which fluid is free to flow at all times between the chambers as the piston and cylinder move relatively to each other, a second passage connecting said two chambers together, said passage forming a path for the fluid in shunt to the first, means for connecting one of the members with the shaft whose axial vibrations are to be restricted which includes a slip-joint so that the rotary movements of the shaft are not transmitted to the member connected thereto, and means connected to the cylinder for supplying fluid to said chambers.

5. In an apparatus of the character described, the combination of a cylinder containing a damping fluid, a piston therein dividing the cylinder space into chambers which are connected by a restricted clearance located between the piston and the surrounding cylinder wall and through which fluid is free to flow at all times from one chamber to the other as the piston moves axially, means connecting the piston and shaft whose axial movements are to be damped which includes a slip-joint so that the shaft can rotate independently of the piston, a shunt passage for the fluid which comprises a chamber and restricted passages, the latter opening into the restricted clearance between the piston and surrounding cylinder wall.

6. In an apparatus of the character described, the combination of a cylinder, a piston located therein which divides the cylinder space into two fluid containing damping chambers with a restricted connection between, a means connected to the piston and the shaft which is to be damped which permits relative rotation of the parts, a supply chamber which is connected by a port with the bottom of the cylinder and has an opening to atmosphere above said port to permit air to escape, and a chamber situated above the cylinder to which said damping chambers are connected, said chambers having an outlet for the escape of gas.

7. In a device of the character described, the combination of a stationary cylinder which is provided with a circumferential groove located between the ends of the piston stroke, a piston located in the cylinder which divides it into two fluid containing chambers, said piston being separated from the cylinder wall by a restricted clearance through which fluid is free to flow in limited quantities upon axial movement of the piston, a supply chamber having a discharge port opening into the groove, a vent for the chamber and means for supplying fluid to the chamber.

In testimony whereof I affix my signature in presence of two witnesses.

OSKAR ANTON WIBERG.

Witnesses:
M. N. ALUNICAY,
EINAR NORDLUNDH.